United States Patent [19]

Ioffe et al.

[11] 4,109,366

[45] Aug. 29, 1978

[54] METHOD OF DISMANTLING UNITS

[76] Inventors: Benyamin Alexandrovich Ioffe, ulitsa Stirnu, 37a, kv. 44; Robert Karlovich Kalnin, ulitsa Gorkogo, 53, kv. 19, both of Riga, U.S.S.R.

[21] Appl. No.: 685,356

[22] Filed: May 11, 1976

[51] Int. Cl.$^2$ ............................................. B23P 19/02
[52] U.S. Cl. ...................................................... 29/427
[58] Field of Search ................... 29/426, 427, 421 R, 29/421 M, 200 D, 200 R, 239, 244, 282; 72/DIG. 26, DIG. 30, 56

[56] References Cited

U.S. PATENT DOCUMENTS

| | | | |
|---|---|---|---|
| 3,214,832 | 11/1965 | Schninghamer | 29/200 D X |
| 3,323,202 | 6/1967 | Brower et al. | 29/421 M |

*Primary Examiner*—Milton S. Mehr
*Attorney, Agent, or Firm*—Haseltine, Lake & Waters

[57] ABSTRACT

A method of dismantling units made up of current-carrying parts assembled with an interference or according to the sliding or running fit. The method consists in placing the units in an alternating magnetic field and orienting them so as to withdraw the parts in the course of dismantling in the direction perpendicular to the induction vector of the field.

The vibration frequency and induction intensity of the field should be sufficient to build up forces which are stronger than the forces of cohesion between the parts in a unit.

4 Claims, 5 Drawing Figures

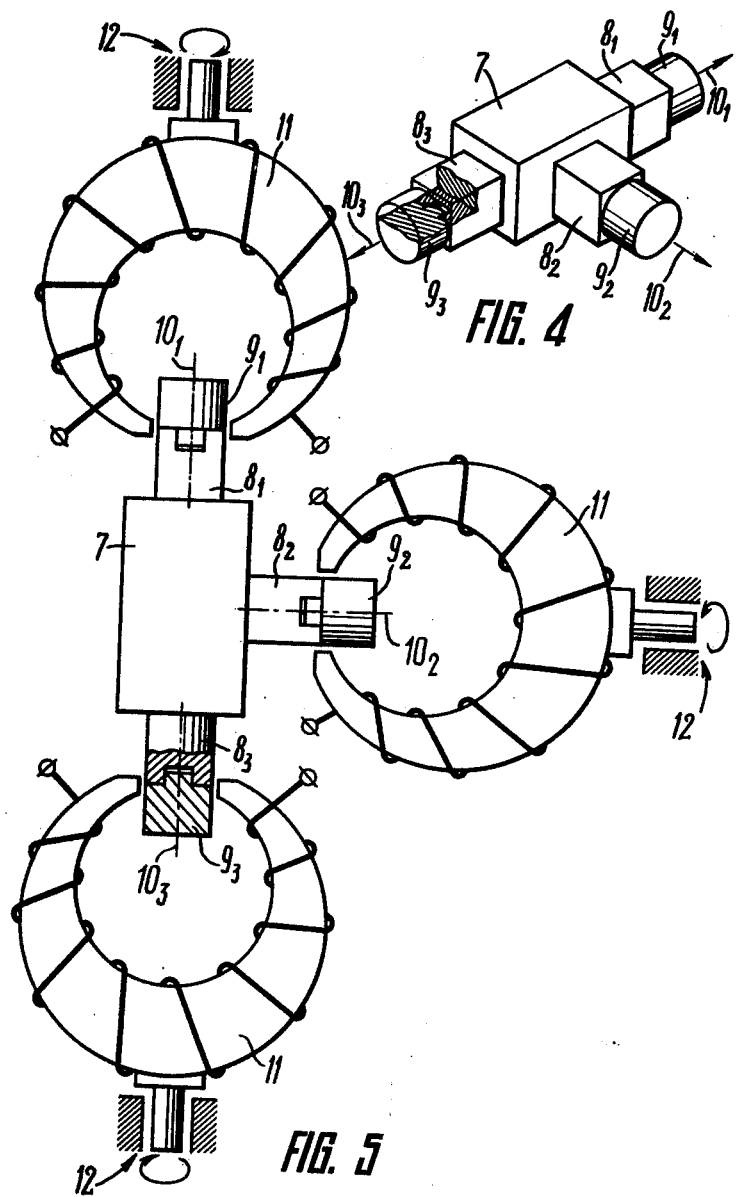

METHOD OF DISMANTLING UNITS

The present invention relates to the field of automating the processes of assembly and dismantling of units and more particularly it relates to the method of dismantling (disassembly) of units made up of current-carrying parts and assembled with an interference, or according to sliding or running fit and can be used successfully in instrument and machine building for automating repair and disassembly operations.

Known in the previous art is a number of methods for dismantling parts assembled with an interference or according to the sliding or running fit wherein the dismantling operations are carried out with the aid of hydraulic devices; also known is a number of mechanically-operated removers a powder-operated explosion remover for bearings and a method of thermal disassembly of interference joints by heating the unit and forcing off its component parts.

However, all the known methods of dismantling prove to be ineffective for the units with complicated jointing surfaces (projections, depressions), also for the units covered with external general insulation or painted. Besides, even in the case of units with a comparatively simple structure the known methods are little efficient since they damage the parts of the unit and impair the standardization of assemblies.

An object of the invention lies in providing a method of dismantling units made up of current-carrying parts assembled with an interference or according to the sliding or running fit which would rule out mechanical damage during dismantling. Another object of the invention is to develop a method of dismantling units which allows dismantling of units with complex jointing surfaces.

Still another object of the invention lies in providing a method allowing efficient dismantling of units covered with general external insulation or painted.

These objects are accomplished by providing a method of dismantling units made up of current-carrying parts assembled with an interference or according to the sliding or running fit wherein, according to the invention, the units are placed in an alternating magnetic field and oriented there so as to withdraw the dismantled parts in the direction perpendicular to the induction vector of the field, the frequency and induction of the field being sufficient to create forces which are stronger than the forces of cohesion of the parts in a unit.

To prevent jamming of parts during dismantling it is practicable that the direction of the field induction vector should be changed in the plane perpendicular to the direction of parts withdrawal.

With a view to cutting down the power expenditures, the magnetic field is concentrated with respect to its density near the jointing plane thereby increasing the power effect.

The method of dismantling units according to the invention ensures efficient noncontact dismantling of units made up of nonmagnetic current-carrying parts assembled with an interference, or according to the sliding or running fit. This eliminates the possibility of mechanical damage of parts, ensures disassembly of parts with complex jointing surfaces and of units covered with protective coatings. The method does not require complex equipment and is simple in realization.

Now the invention will be described in detail by way of example with reference to the accompanying drawings, in which:

FIG. 4 is an isometric view of a unit with a complex shape;

FIG. 5 is a schematic view of a device for dismantling the unit illustrated in FIG. 4.

Figure 1:
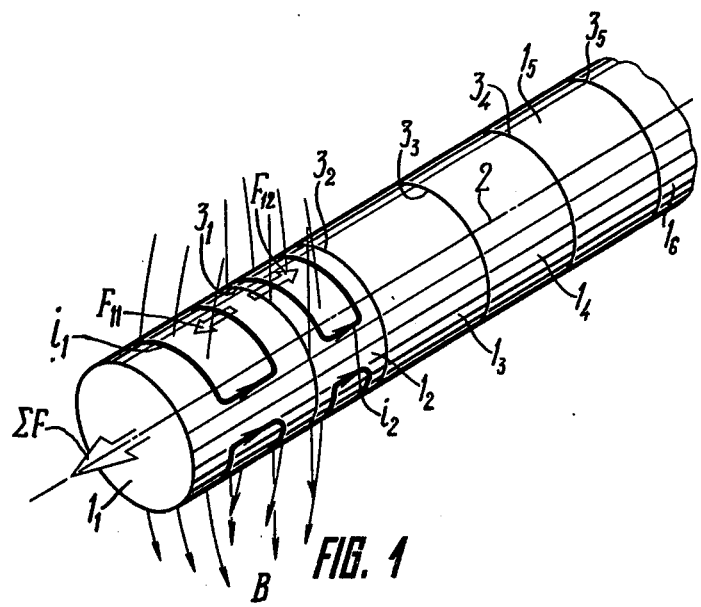
FIG. 1 shows the unit consisting of current-carrying parts in a magnetic field.

Shown in FIG. 1 is an isometric view of a unit consisting of cylindrical nonmagnetic current-carrying parts $1_1$, $1_2$, $1_3$, $1_4$, $1_5$ and $1_6$ assembled with an interference on a common axis 2. The interference in the joint is attained with the aid of projections and depressions in the parts $1_1$ through $1_6$. The required direction of withdrawal of parts $1_{1-6}$ coincides with the direction of the axis of symmetry 2 of the unit. To dismantle the unit, the latter is placed in an alternating uniform magnetic field and oriented so as to set the direction (axis 2) of withdrawal of the parts $1_{1-6}$ perpencidularly to the induction vector B of the magnetic field. Owing to the very fine oxide film between the parts $1_1$, $1_2$, $1_3$, $1_4$, $1_5$ and $1_6$ serving as insulation (this film appears in the atmospheric conditions practically on all nonmagnetic current-carrying parts), current circuits are induced in each part $1_{1-6}$ (in FIG. 1 the equivalent current circuits are shown for parts $1_1$ and $1_2$ and designated by $i_1$ and $i_2$). The circuit currents $i_1$ and $i_2$ induced in the mating adjacent parts $1_1$ and $1_2$ near the jointing plane $3_1$ are opposite in direction. It is known that in this case repulsive forces $F_{11}$ and $F_{12}$ arise between such circuits so that by selecting the sufficient frequency and induction B of the magnetic field it is possible to separate the part $1_1$ from the unit in the direction of arrow ΣF after which the parts $1_2$, $1_3$, etc. are also separate.

However, during such noncontact dismantling it may occur that, for example, the upper portions of the parts $1_1$ and $1_2$ will be repulsed with a stronger force than the lower portions with resultant jamming. To prevent this jamming, the magnetic field is applied alternately in different directions along the jointing plane $3_1$ in which case the direction of the resultant forces ΣF of electrodynamic repulsion is retained but jamming is eliminated.

Figure 2:
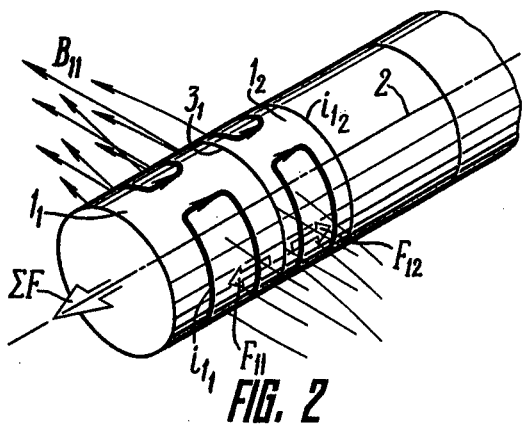
FIG. 2 shows the same unit in the magnetic field with the changed direction of the induction vector.

FIG. 2 shows the same unit placed in an alternating magnetic field whose induction vector B is also arranged in the jointing plane $3_1$ of the parts $1_1$ and $1_2$ which is perpendicular to the direction of withdrawal of the parts 1, but turned through a certain angle with relation to the induction vector B in FIG. 1.

Concentration of the magnetic field near the jointing planes $3_{1-4}$ of the parts 1 increases considerably the repulsive force ΣF by increasing the circuit currents $i_1$ and $i_2$ induced in the parts $1_{1-6}$ and thus makes it possible to dismantle the units assembled with a considerable interference, e.g. in presence of a protective coating.

The process of dismantling by the repulsive forces produced by the circuit currents induced in the parts is facilitated by intermittent application of the magnetic field, i.e. by applying the pulses successively to the jointing planes $3_1$, $3_2$, etc. when the unit is secured at one side or successively to the planes $3_1$ (FIG. 1) and $3_5$, $3_2$ and $3_4$ when the dismantled unit is free and the parts are withdrawn in two directions simultaneously.

Figure 3:
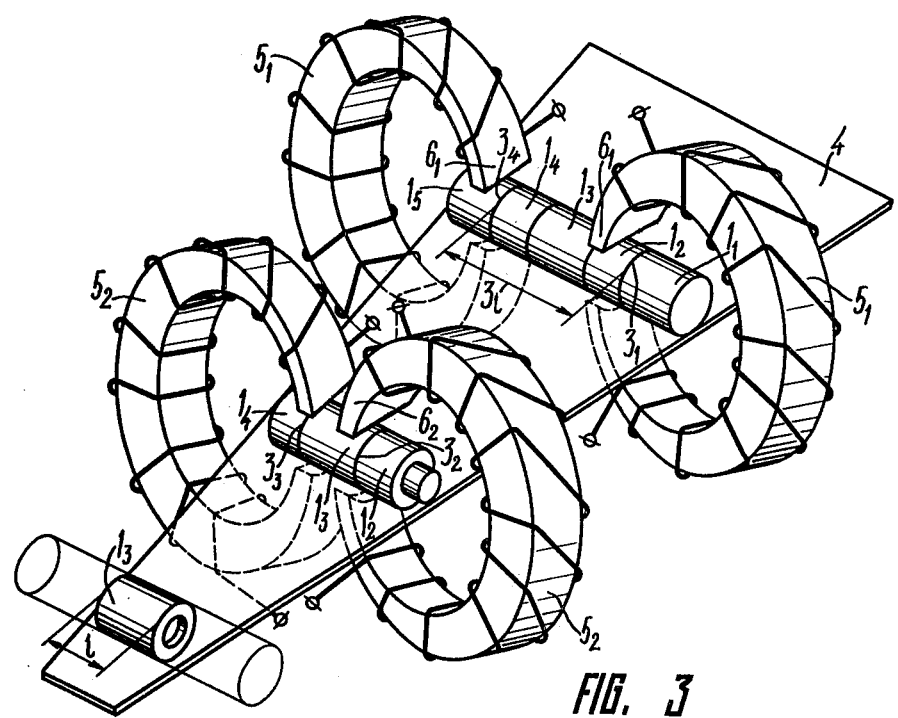
FIG. 3 is a schematic view of the device for dismantling a unit made up of coaxial cylindrical parts.

The device for dismantling a unit consisting of, say, five parts 1, appears in FIG. 3 and consists of two pairs of C-shaped electromagnets $5_1$ and $5_2$ successively arranged on an inclined surface 4.

The pole shoes $6_1$ and $6_2$ of the electromagnets $5_1$ and $5_2$, respectively, are narrower towards the ends for concentrating the magnetic field in the area of the jointing planes $3_1$, $3_2$, $3_3$ and $3_4$.

The distance between the pole shoes $6_1$ of the first pair of magnets is somewhat smaller than 3l where l is the size of one part 1 in the direction of withdrawal whereas the distance between the pole shoes $6_2$ of the magnets $5_2$ of the second pair is somewhat smaller than 1.

The device illustrated in FIG. 3 functions as follows.

As the unit slides over the inclined surface 4 into the space between the pole shoes $6_1$ of the first pair of electromagnets $5_1$, the effect of the magnetic field on the jointing planes $3_1$ and $3_4$ separates the parts $1_1$ and $1_5$ from the unit and the latter move onto the discharge troughs (not shown in FIG. 3). Then the unit consisting now of three parts 1 only moves into the space between the pole shoes $6_2$ of the second pair of electromagnets $5_2$ where the magnetic field acts on the jointing planes $3_2$ and $3_3$; as a result, the next end parts $1_2$ and $1_4$ are separated from the unit and delivered onto the same troughs. For a five-element unit the process of dismantling is completed. The effect of application of the magnetic field alternately in different directions along the jointing plane $3_{1-4}$ is achieved automatically when the unit is rolled in over the inclined surface 4. The distances 1 and 3l between the magnets $5_1$ or $5_2$ within a pair as well as the distance between the pairs of magnets is selected to suit the actual dimensions of the unit and the number of its component elements. Should it be necessary to produce a more prolonged power effect in the course of removal of the dismantled parts, it is practicable that the magnetic field flux should be offset in the direction of withdrawal of the parts 1; in the version of the device shown in FIG. 3 this is achieved by profiling the pole shoes. Coil ends of electromagnets $5_1$ and $5_2$ are connected to A.C. source (not shown in FIG. 3).

FIG. 4 shows an isometric view of a more complicated unit consisting of a base part 7 with three projections $8_1$, $8_2$ and $8_3$ key-jointed to which with an interference are cylindrical parts $9_1$, $9_2$ and $9_3$, respectively, which have to be dismantled along their axes of symmetry $10_1$, $10_2$ and $10_3$.

The version of the device for dismantling the unit shown in FIG. 4 is illustrated schematically in FIG. 5.

This device consists of three C-shaped electromagnets 11 installed, each, symmetrically to one of the axes $10_1$, $10_2$, $10_3$.

Each electromagnet 11 is arranged in such a manner that it builds up a magnetic field whose induction vector is perpendicular to the direction of withdrawal (axis $10_1$, $10_2$, $10_3$) of the respective cylindrical part $9_1$, $9_2$ or $9_3$. The electromagnets 11 are secured on bearing supports 12 which permit said electromagnets 11 to turn around axes $10_1$, $10_2$, $10_3$. Rotation of the electromagnets 11 in the course of unit dismantling makes it possible to change the direction of the induction vector of the magnetic field thus preventing jamming of the parts separated from the unit.

Besides, the electromagnets are installed with a provision for reciprocating along the axes $10_1$, $10_2$, $10_3$. This motion of the electromagnets 11 makes for convenient setting of the unit and, if necessary, for successive withdrawal of the separated parts.

The pole shoes of the electromagnets 11 are shaped so as to ensure concentration of the magnetic field near the jointing plane.

In our example the physical processes underlying the dismantling procedure are similar to those described above. The vibration frequency and induction of the magnetic fields created by the electromagnets 11 are selected by conventional methods with a view to building up forces which exceed the forces of cohesion of the parts $9_1$, $9_2$, $9_3$ with the projections $8_1$, $8_2$, $8_3$, respectively. A.C. source to which wil ends of electromagnets 11 are connected is not shown in FIG. 3 and FIG. 5.

It should be noted that dismantling of joints of the parts assembled according to the sliding or running fit can be carried out in the similar way. A possibility of damageless disjoining of interference — fitted joints attained by virtue of the proposed method is accounted for by a contactless exertion upon the parts being dismantled. Besides, some currents are induced under the effect of variable magnetic field which, depending on the selected field frequency (and thereby on the penetration of the magnetic flux induction) are arranged differently as for depth from the surface of the part involved. For interference-fitted parts of the "shaft-bushing type" it is expedient that currents be induced over the surface thereof. The result is that the bushing is fitted more intensely under the effect of that current, whereby lower force is required for the parts to disjoin. As the heating of the parts being dismantled occurs simultaneously with force exertion, disjoining of the parts takes place as soon as favourable conditions for the latter are attained.

We claim:

1. A method for dismantling units made up of current-carrying parts assembled with an interference or with a sliding or running fit: placing said units in a primary alternating magnetic field and orienting said units in said field in a predetermined manner, withdrawing said parts in the course of dismantling in the direction perpendicular to the induction vector of said field, said field having a vibration frequency and induction intensity, and applying the vibration frequency and induction intensity of said field sufficient for creating forces stronger than the forces of cohesion between said parts in a unit being dismantled, the energy generated by the primary magnetic field providing electrodynamic forces for dismantling said units, said forces forming from simultaneous current induction in parts to be separated from each other, the magnetic field having a direction so that current induced in the parts to be separated is distributed so that a separating line formed by said electrodynamic forces due to interaction of magnetic fields in the parts with said primary magnetic field has the greatest density, the forces applied to each said parts being directed opposite to each other, said parts being substantially free of deformation by said forces, said forces being axial forces.

2. A method of dismantling units according to claim 1 including the step of changing the direction of the induction vector of said field in the course of dismantling in the plane perpendicular to the direction of withdrawal of said parts to avoid locking of said parts.

3. A method of dismantling units according to claim 2 wherein the magnetic field is concentrated near the jointing plane of said part.

4. A method of dismantling units according to claim 1 wherein said magnetic field is concentrated near the jointing plane of said parts.

* * * * *